United States Patent [19]
Yoneno et al.

[11] Patent Number: 5,525,782
[45] Date of Patent: Jun. 11, 1996

[54] ELECTRIC COMBINATION OVEN WITH HUMIDITY CONDITIONER

[75] Inventors: Noriyuki Yoneno, Nara; Naoyoshi Maehara, Nara-ken; Yoshitomo Fujitani, Nara; Miki Moriguchi, Tenri; Yoshifumi Moriya, Nara; Naoko Yanagida, Yamatokoriyama, all of Japan

[73] Assignee: Matsushita Electric Industrial Co., Ltd., Osaka-fu, Japan

[21] Appl. No.: 337,465

[22] Filed: Nov. 8, 1994

[30] Foreign Application Priority Data

Nov. 11, 1993 [JP] Japan .................................. 5-282403
Nov. 19, 1993 [JP] Japan .................................. 5-290802

[51] Int. Cl.⁶ .............................. H05B 6/80; A21B 1/00
[52] U.S. Cl. ...................... 219/682; 219/401; 219/731; 219/686; 99/451; 99/468
[58] Field of Search ............................ 219/682, 686, 219/707, 731, 401; 99/451, 468, 473, 474

[56] References Cited

U.S. PATENT DOCUMENTS

| | | |
|---|---|---|
| 3,470,942 | 10/1969 | Fukada et al. . |
| 3,952,609 | 4/1976 | Klemm .................................. 99/474 |
| 4,366,357 | 12/1982 | Satoh .................................. 219/682 |
| 4,426,923 | 1/1984 | Ohata .................................. 219/401 |
| 4,835,351 | 5/1989 | Smith et al. .......................... 219/682 |
| 4,851,644 | 7/1989 | Oslin .................................. 219/401 |
| 4,924,072 | 5/1990 | Oslin . |
| 5,025,132 | 6/1991 | Fortmann et al. ..................... 219/401 |
| 5,215,000 | 6/1993 | Desage et al. ........................ 99/468 |
| 5,365,039 | 11/1994 | Chaudoir .............................. 219/401 |
| 5,442,994 | 8/1995 | Parker ................................. 99/468 |

FOREIGN PATENT DOCUMENTS

A0000957  3/1979  European Pat. Off. .
A3224853  3/1983  Germany .

OTHER PUBLICATIONS

Patent Abstracts Of Japan, unexamined applications, M. field, vol. 7, No. 240, Oct. 25, 1983, The Patent Office Japanese Government, p. 39 M 251.

Primary Examiner—Philip H. Leung
Attorney, Agent, or Firm—Wenderoth, Lind & Ponack

[57] ABSTRACT

An oven with a humidity conditioner is capable of cooking food by appropriately humidifying or dehumidifying it while the amount of steam contained in an oven cavity is being regulated. The oven includes a heater or magnetron for heating the food accommodated in the oven cavity, a humidity regulator for regulating the humidity inside the oven cavity, a cooking method selector for selecting a cooking method, and a controller for controlling the humidity regulator in response to a signal from the cooking method selector to selectively humidify and dehumidify the interior of the oven cavity.

14 Claims, 11 Drawing Sheets

ELECTRIC COMBINATION OVEN WITH HUMIDITY CONDITIONER

BACKGROUND OF THE INVENTION

1. Field of the Invention

The present invention relates generally to an oven such as a microwave oven, a cooking range or the like and, more particularly, to an oven with a humidity conditioner capable of cooking food by appropriately humidifying or dehumidifying it, i.e., by appropriately regulating the amount of moisture.

2. Description of Related Art

A conventional microwave oven as shown in FIG. 1 is in wide practical use today.

The oven of FIG. 1 has a casing 101 accommodating a turntable 102, on which food 103 is placed for subsequent induction heating. Reference numeral 105 denotes a motor for driving the turntable 102. A magnetron 106, employed as a microwave supply means, effects microwave heating with the use of high-frequency microwaves of, for example, 2,450 MHz. The microwaves emitted from the magnetron 106 are supplied into an oven cavity 104 through a waveguide 107 to heat the food 103. When the magnetron 106 receives high-voltage electric power from a drive unit 108, it oscillates to generate the high-frequency microwaves. Reference numeral 109 denotes a cooling fan for cooling elements that generate heat.

The conventional microwave oven of the above-described construction is designed to cook the food 103 by heating it from inside by induction heating, and is characterized by very easy and quick reheating (warming) and melting of food.

On the other hand, foods have recently undergone drastic changes, and in particular, progress in manufacturing, storing and transporting frozen food and chilled food has promoted the distribution and spread of cooked foods and other similar foods. Therefore, the use of food has been changed for simplicity as represented by the tendency towards the use of cooked food, and the demands for cooking apparatus have been shifted mainly to cooking by reheating.

In such circumstances, the conventional oven was not sufficient for cooking by reheating because of its heating mechanism. That is, there are a variety of cooked foods including oily foods such as fried food and tempura, vegetable foods such as fresh vegetables and boiled vegetables, stewed foods, and steamed foods. It is now hard to reproduce sufficiently the original taste of the food or to cook healthfully while maintaining nutrients only by heating with microwaves, and an oven capable of reheating in a manner which depends on the conditions of the food has been demanded. At the same time, frozen foods are varied in shape and in combinations of food materials, and thawing by a microwave oven tends to cause uneven heating due to difference in the microwave absorbing characteristics of the food. Accordingly, a cooking apparatus having superior thawing performance has been demanded.

FIG. 2 depicts a conventional combination oven. In high-frequency heating, a drive unit (not shown) supplies a high-frequency oscillator 106 with high-voltage electric power to cause it to oscillate and generate high-frequency microwaves. The high-frequency microwaves generated by the high-frequency oscillator 106 are supplied into the oven cavity 104 through a waveguide 107 to heat food 103 on the turntable 102. During heating, heat generated by a heater 110 is used to heat the food 103 by infrared radiation or convection.

In the above-described construction, however, when cooked rice is reheated, for example, as the food is heated, moisture in the food is vaporized, and the food surface is dried and hardened.

To remedy such a defect, a combination oven with a steam generator as shown in FIG. 3 has been proposed. The oven of FIG. 3 is provided with a steam generator 112 comprised of a water tank 113 and a heater 111, in addition to the construction of FIG. 2.

Food 103 placed on the turntable 102 inside the oven cavity 104 is heated by high-frequency microwaves that are generated by the high-frequency oscillator 106 and introduced into the oven cavity 104 through the waveguide 107. Moreover, the water in the steam generator 112 is converted, by the heater 111, into steam 114, which is introduced into the oven cavity 104 to prevent the food 103 from being dried during cooking.

On the other hand, when fried food is reheated, the water content on the food surface is increased due to migration of moisture onto the food surface caused by vaporization of moisture inside the food, and also due to a reduction in speed of vaporizing from the food surface caused by humidity elevation in the oven cavity.

In this construction, however, since the steam generator 112 comprised of the heater 111 and the water tank 113 is separately provided, water feed into the steam generator 112 and treatment of drain water are troublesome.

Furthermore, when the fried food is reheated, the food surface becomes damp due to an increase of moisture on the food surface in the heating process, and a crisp and fresh surface cannot be expected.

SUMMARY OF THE INVENTION

The present invention has been developed to overcome the above-described disadvantages.

It is accordingly an objective of the present invention to provide an oven with a humidity conditioner capable of cooking food while humidifying it without supply of water or treatment of drain water, and also capable of cooking the food while dehumidifying it depending on the kind of food.

Another objective of the present invention is to provide an oven with a humidity conditioner capable of humidifying or dehumidifying as desired during cooking, while regenerating an adsorbent necessary for humidifying and dehumidifying within a short period of time.

A further objective of the present invention is to provide the oven of the above-described type which not only exhibits superior cooking abilities by supplying a wide variety of food with optimized steam, but also enables automatic cooking while ensuring high heating performance, enhanced airtightness, and enhanced safety.

In accomplishing the above and other objectives, the oven according to the present invention comprises a food heating means for heating food accommodated in an oven cavity, a humidity regulating means for regulating the humidity inside the oven cavity, a cooking method selecting means for selecting a cooking method, and a control means for controlling the humidity regulating means in response to a signal from the cooking method selecting means to selectively humidify and dehumidify the interior of the oven cavity.

By the above-described construction, upon placement of the food inside the oven cavity, when the cooking method is selected by the cooking method selecting means, the control means controls the humidity regulating means in response to the signal therefrom so that the food may be appropriately heated while the amount of steam inside the oven cavity is being regulated. Accordingly, tasty food with a preferred finish can be presented because the food surface is neither too damp nor too dry.

Also, as occasion demands, the food can be heated while the interior of the oven cavity is being dehumidified. Accordingly, the surface of tempura or fried food can be dried, thus providing crisp and tasty food. Also, the food can be heated while the interior of the oven cavity is being humidified and, hence, tasty food can be presented without drying or hardening the surface of foods such as Chinese cake and dumplings.

Preferably, the humidity regulating means comprises an internal suction port facing the oven cavity, an internal discharge port facing the oven cavity, a circulation duct for communicating the internal suction port and the internal discharge port with each other, and a humidity regulator accommodated in the circulation duct. This construction is relatively simple, but can achieve the desired end.

Alternatively, the humidity regulating means may comprise an internal suction port facing the oven cavity, an external suction port facing the outside of the oven cavity, a suction duct for communicating the internal suction port and the external suction port with each other, a suction port switching member accommodated in the suction duct, an internal discharge port facing the oven cavity, an external discharge port facing the outside of the oven cavity, a discharge duct for communicating the internal discharge port and the external discharge port with each other, a discharge port switching member accommodated in the discharge duct, a communication duct for communicating the suction duct and the discharge duct with each other, and a humidity regulator accommodated in the communication duct.

According to this construction, upon selection of either "dehumidified cooking" or "humidified cooking" by the cooking method selecting means, external air can be introduced inside the oven cavity by properly switching the suction port switching member and the discharge port switching member. It is, there/ore, possible to set the interior of the oven cavity in a desired dehumidified or humidified state.

Conveniently, the humidity regulator comprises an adsorbent having water absorption properties.

By adsorbing steam generated from the food using the adsorbent, the food can be heated while the interior of the oven cavity is being dehumidified, or by releasing moisture adsorbed by the adsorbent, the food can be heated while the interior of the oven cavity is being humidified with a simple structure not requiring supply of water or treatment of drain water.

Advantageously, a heater is interposed between the oven cavity and the humidity regulating means. In this case, when air heated by the heater passes through the humidity regulating means, the air can readily release moisture contained therein.

In another aspect of the present invention, the oven comprises a food heating means for heating food accommodated in an oven cavity, a humidity regulating means comprising a steam adsorption means for regulating the humidity inside the oven cavity, a cooking method selecting means for selecting a cooking method, and a control means for controlling the humidity regulating means in response to a signal from the cooking method selecting means to regulate the amount of moisture contained in the oven cavity, i.e., to dehumidify or humidify the interior of the oven cavity.

By the above-described construction, upon placement of the food inside the oven cavity, when the cooking method is selected by the cooking method selecting means, the control means controls the humidity regulating means in response to the signal therefrom so that the food may be appropriately heated while steam contained in the oven cavity is adsorbed by the steam adsorption means or the steam is emitted therefrom into the oven cavity.

Advantageously, the humidity regulating means comprises an internal suction port facing the oven cavity, an internal discharge port facing the oven cavity, a circulation duct for communicating the internal suction port and the internal discharge port with each other, a blower for sending air to the steam adsorption means, and a heat supply means for supplying the steam adsorption means with thermal energy. In this case, the steam adsorption means is accommodated in the circulation duct.

According to this construction, when the food is cooked while being humidified, a moisture adsorbing process is carried out prior to cooking (at the end of cooking) without requiring supply of water or treatment of drain water. In the moisture adsorbing process, the control means causes the steam adsorption means to adsorb moisture contained in the air in response to a signal indicative of "humidified cooking" selected manually or automatically by the cooking method selecting means. On the other hand, when the food is cooked while being dehumidified, a regeneration process is carried out prior to cooking (at the end of cooking). In the regeneration process, the control means causes the steam adsorption means to emit moisture contained therein in response to a signal sent manually or automatically from the cooking method selecting means.

Preferably, the humidity regulating means comprises an internal suction port facing the oven cavity, an external suction port facing the outside of the oven cavity, a suction duct for communicating the internal suction port and the external suction port with each other, a suction port switching member accommodated in the suction duct, an internal discharge port facing the oven cavity, an external discharge port facing the outside of the oven cavity, a discharge duct for communicating the internal discharge port and the external discharge port with each other, a discharge port switching member accommodated in the discharge duct, a communication duct for communicating the suction duct and the discharge duct with each other, a blower for sending air to the steam adsorption means, and a heat supply means for supplying the steam adsorption means with thermal energy. In this case, the steam adsorption means is accommodated in the communication duct.

In the humidified cooking process, on the basis of a signal indicative of "humidified cooking" selected manually or automatically by the cooking method selecting means, the control means switches, prior to cooking (at the end of cooking), the suction port switching member and the discharge port switching member to open the external suction port and the external discharge duct, respectively. By so doing, moisture contained in the air outside the oven cavity is adsorbed by the steam adsorption means. After this adsorption process, steam is generated within a short period of time by switching the suction port switching member and the discharge port switching member to open the internal suction port and the internal discharge duct, respectively, and by supplying the heat supply means with electric power, and also by operating the blower. Thus, desired humidified cooking is realized in which the moisture outside the oven cavity is freely utilized. In the case of dehumidified cooking, the control means switches both the switching members so as to carry out the regeneration process within a short period of time, with the generated steam discharged outside the oven cavity.

Furthermore, because the food accommodated in the oven cavity can be heated with steam at a desired temperature, steam heating at a low temperature of about 60° to 70° C., steam heating at about 100° C., dry steam heating at about 150° to 200° C., and their combined heating can be effected depending on the kind and quantity of food. Heat transfer by steam enables heating at a high heat flow rate, as compared with ordinary heat transfer by air, thus enabling high-speed heating. Also, because dry steam heating, wet steam heating, and their combined heating are possible, uniform and appropriate heating is achieved at a relatively high speed depending on the kind and quantity of food.

Alternatively, the humidity regulating means comprises an internal suction port facing the oven cavity, an internal discharge port facing the oven cavity, a circulation duct for communicating the internal suction port and the internal discharge port with each other, a blower for sending air to the steam adsorption means, and a high-frequency supply means for supplying the steam adsorption means with high frequency. In this case, the steam adsorption means is accommodated in the circulation duct.

According to this construction, by supplying the high-frequency supply means with electric power and by operating the blower, humidified cooking can be realized in which steam is generated within a short period of time. Also, after the regeneration process in which moisture contained in the steam adsorption means is emitted therefrom within a short period of time, dehumidified cooking can be carried out.

When the heat supply means or the high-frequency supply means is employed to apply energy to water molecules contained in the steam adsorption means to thereby emit moisture therefrom, the water molecules adsorbed thereby from the air is converted to steam. By so doing, water can be supplied from the air automatically, and the user can save time to replenish water. Also, condensation of steam in the oven cavity is avoided by adsorbing again the steam once discharged into the oven cavity, thereby preventing flooding in the oven cavity, and corrosion and trouble of the appliance.

The steam adsorption means may contain a magnetic or metallic material, and the humidity regulating means may comprise an exciting means for applying thermal energy to the magnetic or metallic material. In this case, energization of the exciting means renders the steam adsorption means to emit moisture adsorbed thereby to generate steam.

This construction is particularly effective because the thermal energy applied to the magnetic or metallic material heats the steam adsorption means itself, realizing a highly efficient water-molecule separation.

Advantageously, the exciting means comprises an induction-heating means. The induction-heating means applies thermal energy to the steam adsorption means without contacting it, to thereby emit water molecules therefrom to generate steam. Furthermore, the steam adsorption means and the induction-heating means can be separated and insulated from each other, thus enhancing safety and airtightness and providing a highly efficient oven that can be readily manufactured at a low cost.

A heater may be interposed between the oven cavity and the humidity regulating means to allow the humidity regulating means to easily emit moisture when air heated by the heater passes through the humidity regulating means.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
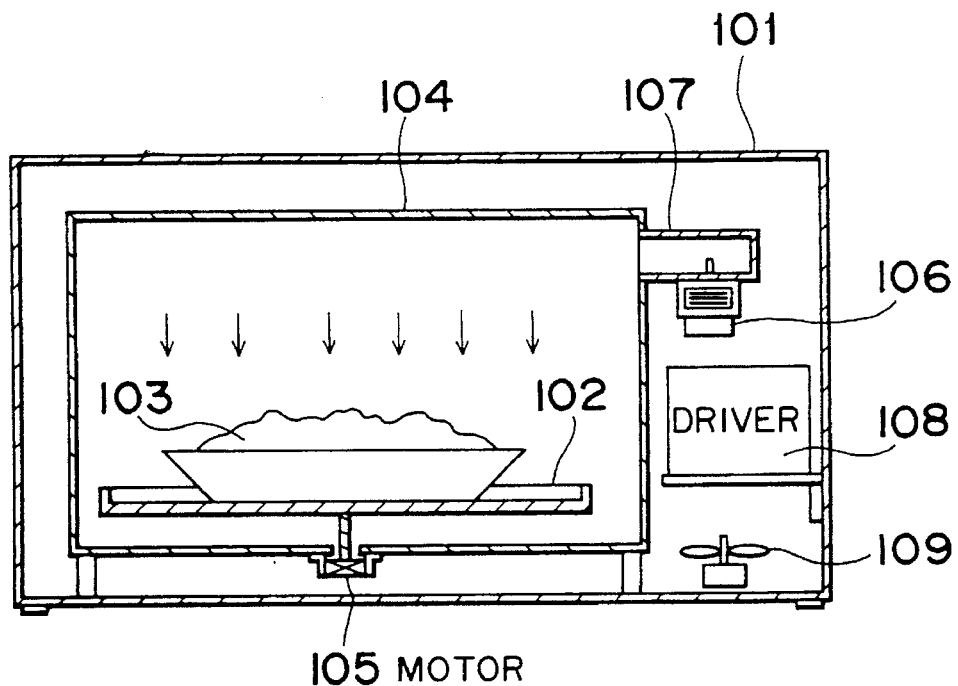
FIG. 1 is a schematic vertical sectional view of a conventional microwave oven.
Figure 2:
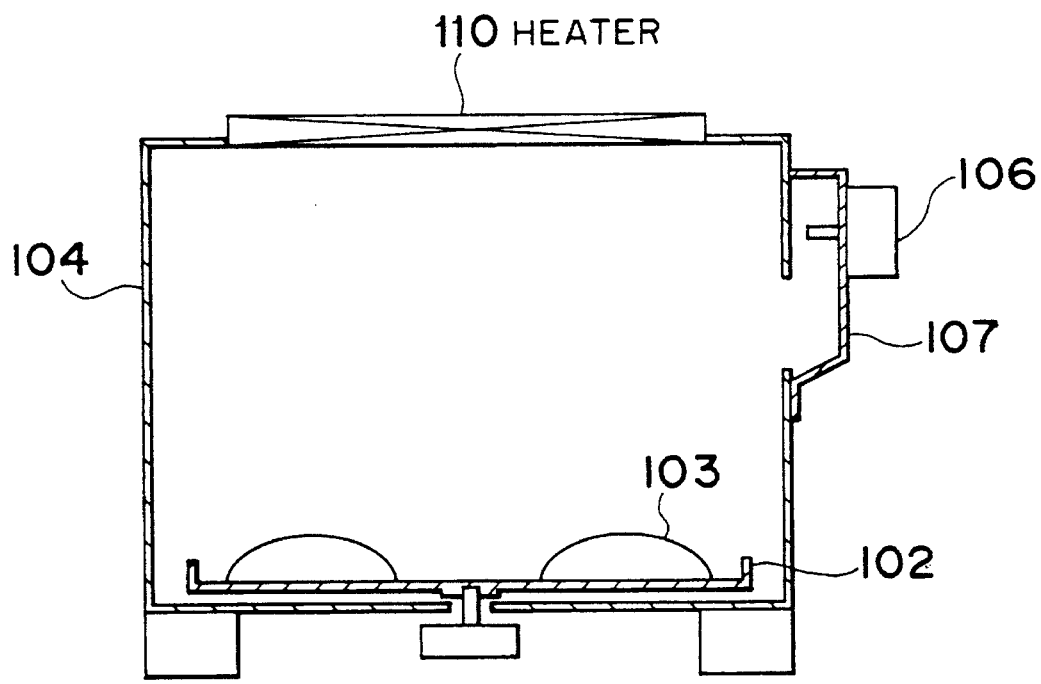
FIG. 2 is a schematic vertical sectional view of a conventional combination oven.
Figure 3:
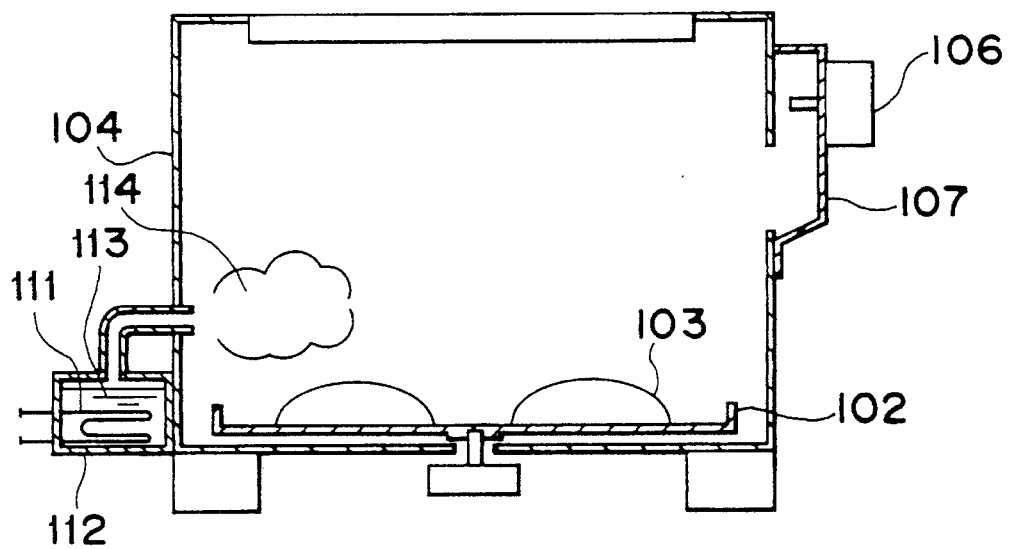
FIG. 3 is a schematic vertical sectional view of another conventional combination oven.

Referring now to the drawings, several embodiments of the present invention are hereinafter described in detail. The terms "humidified cooking" and "dehumidified cooking" as employed throughout this specification are defined as the cooking of food while the food is being humidified, and the cooking of food while the food is being dehumidified, respectively.

(Embodiment 1)

Figure 4:
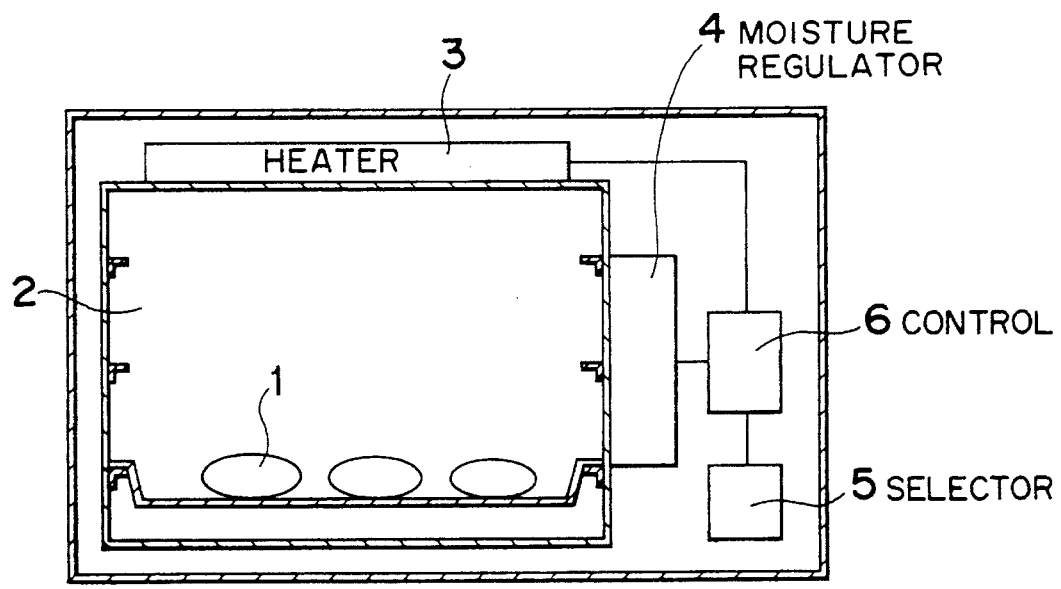
FIG. 4 is a schematic vertical sectional view of an oven according to a first embodiment of the present invention.

In FIG. 4, reference numeral 1 denotes food, reference numeral 2 an oven cavity for accommodating the food 1, and reference numeral 3 a heater employed as means for heating the food 1. Also, reference numeral 4 denotes a humidity regulating means for regulating the amount of steam contained in the oven cavity 2, reference numeral 5 a cooking method selecting means for selecting a cooking method, and reference numeral 6 a control unit for controlling the heater 3 and the humidity regulating means 4 on the basis of a signal from the cooking method selecting means 5.

In the above-described construction, when the cooking method is selected by the cooking method selecting means 5 after the food 1 has been accommodated in the oven cavity 2, the control unit 6 energizes the heater 3 and controls the humidity regulating means 4 in response to the signal from the cooking method selecting means 5. That is, when the food 1 is heated by radiation or convective heat transfer effected by the heater 3, steam is evaporated from the food 1. In this event, the amount of steam contained in the oven cavity 2 is regulated by the humidity regulating means 4 and, hence, the food surface is neither damp nor dry, so that tasty food having a favorable finish can be presented.

Figure 5:
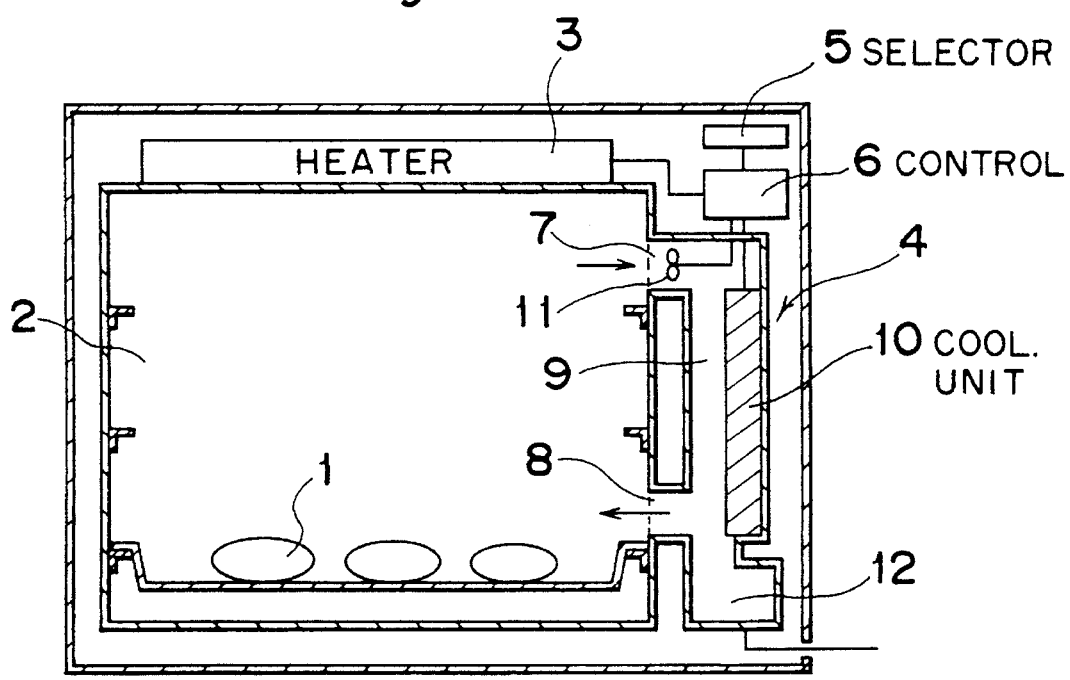
FIG. 5 is a schematic vertical sectional view of the oven of FIG. 4, but showing the specific structure of a humidity regulator.

FIG. 5 depicts the specific structure of the humidity regulating means 4, which is employed to dehumidify the interior of the oven cavity 2 by cooling air containing moisture.

In FIG. 5, reference numeral 7 denotes a suction port provided in the oven cavity 2, reference numeral 8 a discharge port, and reference numeral 9 a circulation duct for circulating the air in the oven cavity 2 by communicating between the suction port 7 and the discharge port 8. Also, reference numeral 10 denotes a cooling unit provided in the circulation duct 9, reference numeral 11 a blower for sending air to the cooling unit 10, and reference numeral 12 a tray for collecting condensate produced by the cooling unit 10.

In this construction, when "dehumidifying and heating" is selected by the cooking method selecting means 5 after the food 1 has been accommodated in the oven cavity 2, the control unit 5 energizes the heater 3, and operates the blower 11 and the cooling unit 10. The air containing steam generated from the food 1 by heating in the oven cavity is sent to the circulation duct 9 from the suction port 7 by the blower 11, and is cooled by the cooling unit 10 provided in the circulation duct 9 for condensation thereof. The condensate produced by the cooling unit 10 is collected in the tray 12, and dry air is sent into the oven cavity 2 from the discharge port 8. Because the food 1 can be heated while the interior of the oven cavity 2 is being dehumidified by condensing the steam generated from the food 1 with the use of the cooling unit 10, the surface of food such as tempura and fried food can be dried, thus providing crisp and tasty food.

(Embodiment 2)

Figure 6:
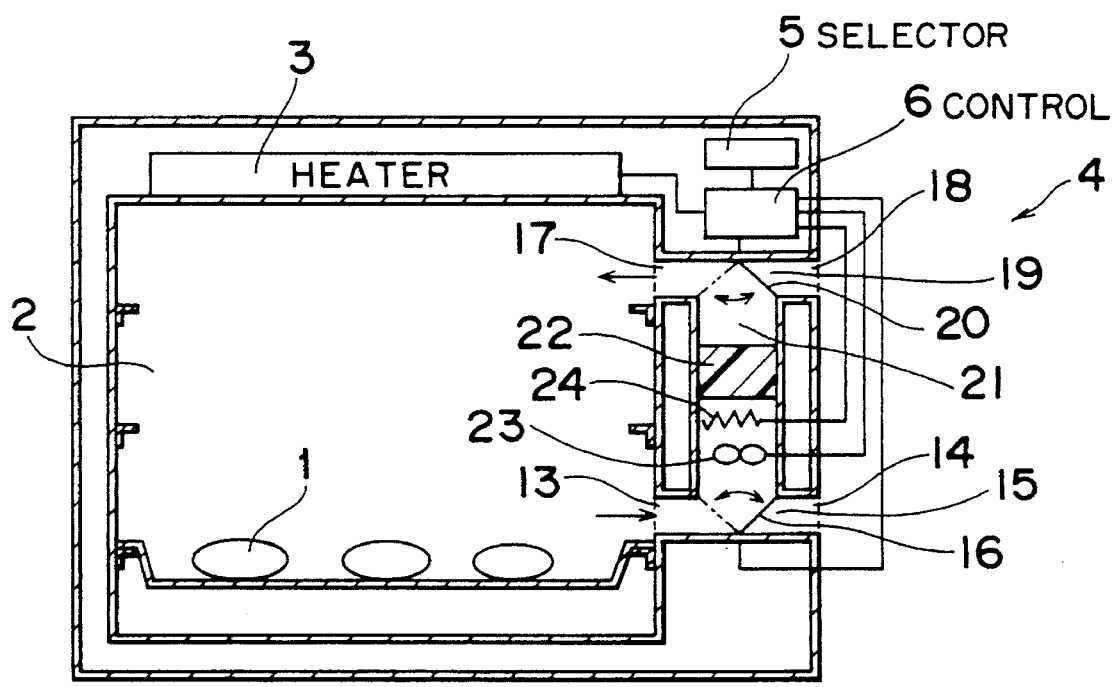
FIG. 6 is a view similar to FIG. 5, but according to a second embodiment of the present invention.

FIG. 6 depicts an oven accommodating a humidity regulating means 4 in which an adsorbent is employed.

In FIG. 6, reference numeral 13 denotes an internal suction port facing the oven cavity 2, reference numeral 14 an external suction port facing the outside of the oven cavity 2, reference numeral 15 a suction duct for communicating between the internal suction port 13 and the external suction port 14, and reference numeral 16 a suction port switching member provided in the suction duct 15. Also, reference numeral 17 denotes an internal discharge port facing the oven cavity 2, reference numeral 18 an external discharge port facing the outside of the oven cavity 2, reference numeral 19 a discharge duct for communicating between the internal discharge port 17 and the external discharge port 18, and reference numeral 20 a discharge port switching member provided in the discharge duct 19. Further, reference numeral 21 denotes a communication duct for communicating between the suction duct 15 and the discharge duct 19, reference numeral 22 an adsorbent such as silica gel, zeolite or the like, reference numeral 23 a blower for sending air to the adsorbent 22, and reference numeral 24 a heat source for supplying thermal energy to the adsorbent 22.

In the above-described construction, upon placement of food 1 inside the oven cavity 2, when "dehumidified cooking" or "humidified cooking" is selected by the cooking method selecting means 5, the control unit 6 energizes the heater 3 and controls the humidity regulating means 4 so that the food 1 may be heated while the interior of the oven cavity 2 is being dehumidified or humidified.

When dehumidifying and heating are performed, prior to cooking (at the end of cooking), a regeneration process for removing moisture from the adsorbent 22 is carried out. The regeneration process is followed by a cooking process. That is, in the regeneration process, the control unit 6 operates the suction port switching member 16 and the discharge port switching member 20 to open the external suction port 14 and the external discharge port 18, respectively. The control unit 6 then supplies the heat source 24 with electric power, and operates the blower 23. In this case, air sucked in from the external suction port 14 is heated by the heat source 24 and is sent to the adsorbent 22. When the heated air passes through the adsorbent 22, the moisture contained therein is removed therefrom, and the air is discharged from the external discharge port 18.

In the dehumidified cooking process, the control unit 6 operates the suction port switching member 16 and the discharge port switching member 20 to open the internal suction port 13 and the internal discharge port 17, respectively, and also operates the blower 23. Then, air in the oven cavity 2 containing steam generated from the food 1 is sent from the internal suction port 13 to the adsorbent 22, which in turn converts such air to dry air by adsorbing moisture from the former. The dry air is sent to the oven cavity 2 through the internal discharge port 17. Because the adsorbent 22 adsorbs the moisture contained in the food 1, the food 1 can be heated while the oven cavity 2 is being dehumidified. As a result, the surface of foods such as tempura and fried food can be dried, thus providing crisp and tasty food.

In the case of humidified cooking, prior to cooking (at the end of cooking), a moisture absorbing process in which moisture contained in air is adsorbed by the adsorbent 22 is carried out. The absorbing process is followed by a humidified cooking process.

That is, in the moisture adsorbing process, the control unit 6 operates the suction port switching member 16 and the discharge port switching member 20 to open the external suction port 14 and the external discharge port 18, respectively, and also operates the blower 23. In this case, the air sucked in from the external suction port 14 is sent to the adsorbent 22 by the blower 23, and moisture contained in the air is adsorbed by the adsorbent 22, and dried air is discharged from the external discharge port 18.

In the humidified cooking process, the control unit 6 operates the suction port switching member 16 and the discharge port switching member 20 to open the internal suction port 13 and the internal discharge port 17, respectively. Also, the control unit 6 supplies the heat source 24 with electric power and operates the blower 23. In this case, air sucked in from the internal suction port 13 is heated by the heat source 24, and is sent to the adsorbent 22. When the heated air passes through the adsorbent 22, the moisture adsorbed by the adsorbent 22 is transferred to the air, and hot and damp air is sent into the oven cavity 2 from the internal discharge port 17. In this way, by effectively utilizing the moisture adsorbed by the adsorbent 22, the food 1 can be heated while the interior of the oven cavity 2 is being humidified with a simple construction not requiring supply of water or treatment of drain water. Accordingly, for example, in cooking a Chinese cake or dumpling, tasty food can be presented without drying or hardening the food surface.

As described above, dehumidified cooking or humidified cooking can be selected depending on the type of food, thus providing tasty food.

(Embodiment 3)

Figure 7:
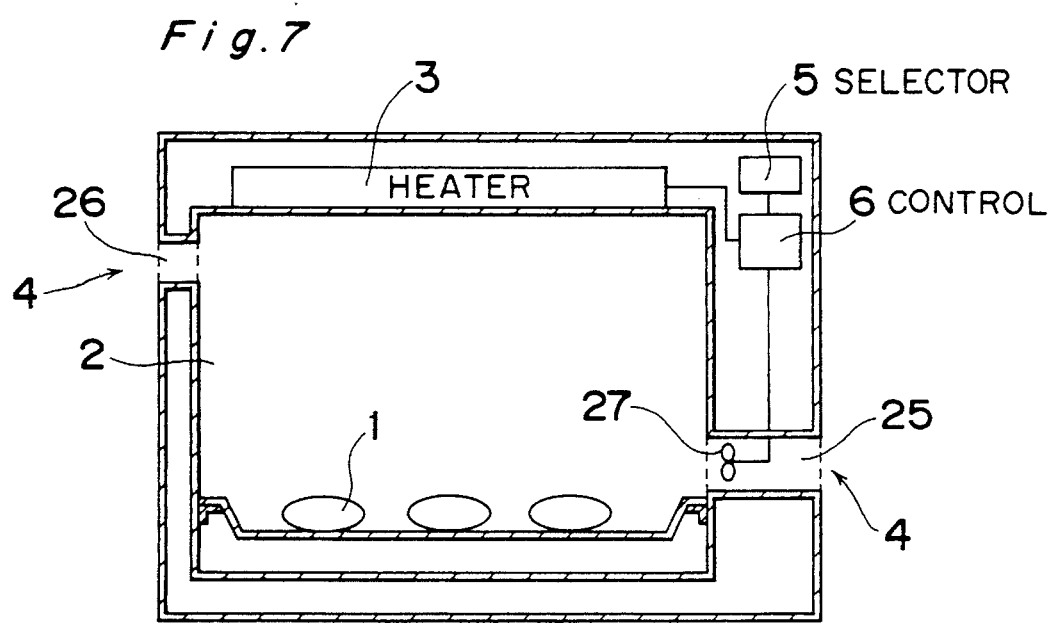
FIG. 7 is a view similar to FIG. 5, but according to a third embodiment of the present invention.

FIG. 7 depicts an oven having a humidity regulating means which is employed to dehumidify the interior of the oven cavity 2 by introducing external air thereinto.

In FIG. 7, reference numeral 25 is a suction port for introducing air outside the oven cavity 2 into the oven cavity 2, reference numeral 26 a discharge port for discharging the air from the oven cavity 2, and reference numeral 27 a blower provided in the suction port 25.

In this construction, when "dehumidifying and heating" is selected by the cooking method selecting means 5 after food 1 has been accommodated in the oven cavity 2, the control unit 6 energizes the heater 3, and operates the blower 27 to introduce air outside the oven cavity 2 into the oven cavity 2 through the suction port 25 to blow onto the food surface, while air containing moisture in the oven cavity 2 is exhausted from the discharge port 26. In this way, by introducing the fresh air into the oven cavity 2, the food 1 can be heated while the interior of the oven cavity 2 is being dehumidified. Accordingly, the surface of fried food can be dried with a simple structure, thus providing crisp and tasty fried food.

It is to be noted that substantially the same effects can be obtained by installing the blower 27 inside the discharge port 26 to exhaust the air in the oven cavity 2.

(Embodiment 4)

Figure 8:
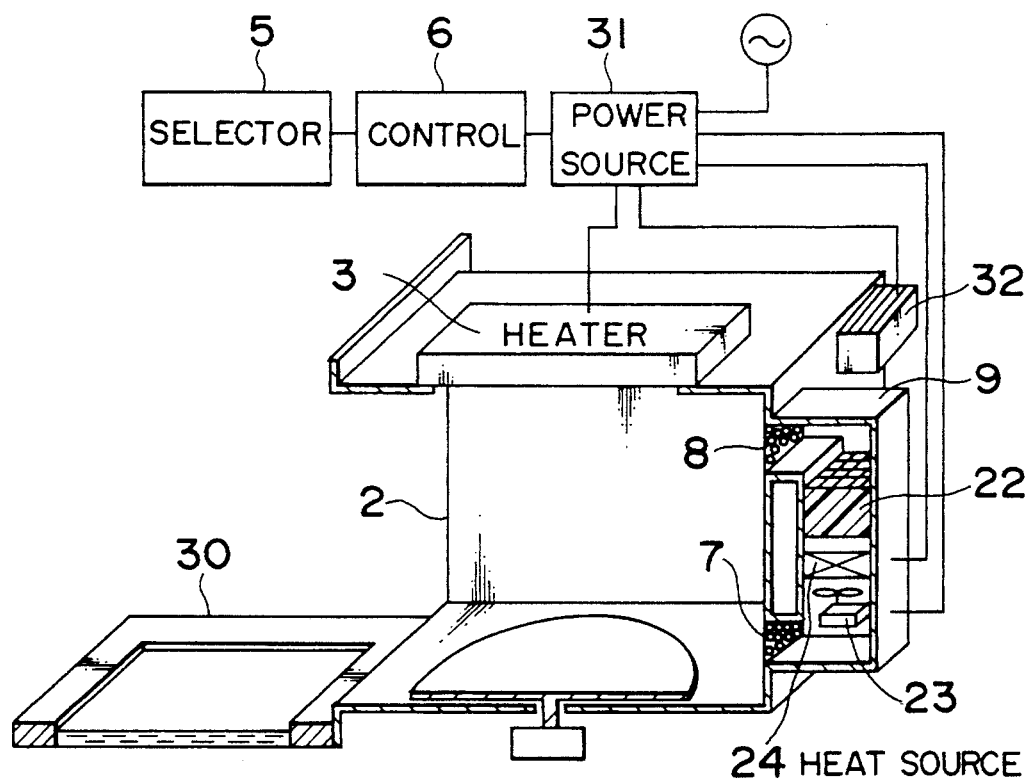
FIG. 8 is a schematic perspective view, partly in section, of a combination oven according to a fourth embodiment of the present invention.

FIG. 8 depicts a combination oven having a suction port 7, a discharge port 8, and a circulation duct 9 for communicating between the suction port 7 and the discharge port 8.

In FIG. 8, reference numeral 30 denotes a door for selectively opening and closing the oven cavity 2 (as a matter of course, each of the ovens as discussed above also has a door). Inside the circulation duct 9 are provided an adsorbent 22 such as silica gel, zeolite or the like, a blower 23 for sending air to the adsorbent 22, and a heat source 24 such as, for example, an electric heater for feeding thermal energy to the adsorbent 22. Electric power is supplied to the blower 23 and the heat source 24 from a power source 31, and the control unit 6 controls the power source 31 on the basis of a signal from the cooking method selecting means 5 for selecting any one of "humidified cooking" and "dehumidified cooking" depending on information from a sensor. The cooking method can also be selected manually.

In the above-described construction, when "humidified cooking" is selected by the cooking method selecting means 5, prior to cooking (at the end of cooking), moisture in the air is adsorbed by the adsorbent 22 during a moisture adsorbing process. The adsorbing process is followed by the humidified cooking process. That is, in the moisture adsorbing process, on the basis of the signal indicative of "humidified cooking" selected manually or automatically by the cooking method selecting means 5, the control unit 6 operates the blower 23 without supplying electric power to the heat source 24 so that the moisture may be adsorbed by the adsorbent 22.

In the humidified cooking process, the control unit 6 supplies electric power to the heat source 24 and operates the blower 23. In this case, air sucked in through the suction port 7 is heated by the heat source 24 and is turned into hot air. When the hot air passes through the adsorbent 22, it removes the moisture from the adsorbent 22. Because of this, hot and damp air is sent into the oven cavity 2 from the discharge port 8, thereby humidifying and heating the food 1 in the oven cavity 2.

On the other hand, when "dehumidified cooking" is selected by the cooking method selecting means 5, the regeneration process for removing the moisture from the adsorbent 22 is first effected prior to cooking, and the dehumidified cooking process is subsequently effected. More specifically, in the regeneration process, the control unit 6 supplies electric power to the heat source 24 and operates the blower 23. In this case, when high-temperature air produced by the heat source 24 passes through the adsorbent 22, it takes the moisture away from the adsorbent 22, and damp air is discharged from the oven cavity 2 when the door 30 is opened.

In the dehumidified cooking process, the control unit 6 operates the blower 23 to heat the food 1 while controlling the heat source 24 so that the air passing the heat source 24 may not remove the moisture from the adsorbent 22. Steam generated from the food 1 during cooking is led to the adsorbent 22 from the suction port 7 and is adsorbed by the adsorbent 22. As a result, the humidity in the oven cavity 2 is maintained low, thus realizing dehumidified cooking.

In addition to the above-described construction, one or both of an electric heating means 3 such as, for example, an infrared ray heater, and a high-frequency supply means 32 such as, for example, a magnetron, may be provided near the oven cavity 2. In this case, in the humidified cooking process, the control unit 6 supplies electric power to the heat source 24, operates the blower 23, and also operates the heating means 3 or the high-frequency supply means 32, thereby realizing humidified cooking under optimum heating conditions. On the other hand, in the dehumidified cooking process, the control unit 6 operates the blower 23 and the heating means 3 or the high-frequency supply means 32, thereby realizing dehumidified cooking under optimum heating conditions.

(Embodiment 5)

Figure 9:
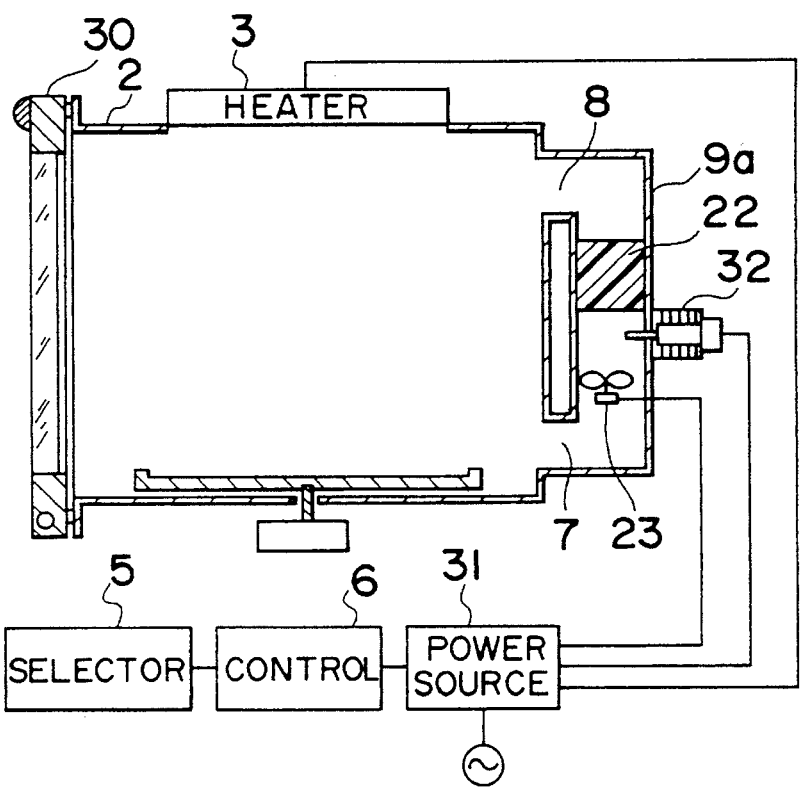
FIG. 9 is a view similar to FIG. 5, but according to a fifth embodiment of the present invention.

FIG. 9 depicts a combination oven having a suction port 7, a discharge port 8, and a waveguide 9a for supplying high frequency waves. The waveguide 9a corresponds to the circulation duct for communicating between the suction port 7 and discharge port 8. Inside the waveguide 9a are provided an adsorbent 22 such as silica gel, zeolite or the like, a blower 23 for sending air to the adsorbent 22, and a high-frequency supply means 32 such as, for example, a magnetron for supplying high-frequency energy into the oven cavity 2 through the waveguide 9a. Because the other structure is substantially the same as that shown in FIG. 8, description thereof is omitted for brevity's sake.

Electric power is supplied to the blower 23 and the high-frequency supply means 32 from the power source 31. The control unit 6 controls the power source 31 on the basis of a signal from the cooking method selecting means 5 for selecting any one of "humidified cooking" and "dehumidified cooking" depending on information from a sensor. The cooking method can also be selected manually.

In this construction, when "humidified cooking" is selected by the cooking method selecting means 5, prior to cooking (at the end of cooking), moisture in the air is adsorbed by the adsorbent 22 in the moisture adsorbing process. The moisture adsorbing process is followed by the humidified cooking process. That is, in the moisture adsorbing process, on the basis of the signal indicative of "humidified cooking" selected manually or automatically by the cooking method selecting means 5, the control unit 6 operates the blower 23 without supplying electric power to the high-frequency supply means 32 so that the moisture may be adsorbed by the adsorbent 22.

In the humidified cooking process, the control unit 6 supplies electric power to the high-frequency supply means 32 and operates the blower 23. In this case, the high frequency removes the moisture from the adsorbent 22. The removal of the moisture by the high frequency is effected within a short period of time because water molecules are vibrated directly. For example, when a high-frequency output of 700 W is supplied to a molded material of zeolite processed in corrugated form, about 40 g of moisture can be removed within about 60 seconds. The moisture removed from the adsorbent 22 is sucked in from the suction port 7, and is sent into the oven cavity 2 from the discharge port 8 together with the air led into the waveguide 9a. Moreover, the high frequency supplied into the oven cavity 2 through the suction port 7 or the discharge port 8 as a supply port and through the waveguide 9a heats the food 1, thereby realizing humidified cooking.

On the other hand, when "dehumidified cooking" is selected by the cooking method selecting means 5, prior to cooking, the regeneration process is first effected to remove the moisture from the adsorbent 22. The dehumidified cooking process is carried out after the regeneration process. That is, in the regeneration process, the control unit 6 supplies electric power to the high-frequency supply means 32 and operates the blower 23. In this case, the high frequency removes the moisture from the adsorbent 22 within a short period of time, as mentioned above. The moisture removed from the adsorbent 22 is sucked in from the suction port 7, and is sent into the oven cavity 2 through the discharge port 8 together with the air led into the waveguide 9a. The moisture is then discharged outside when the door 30 is opened.

In the dehumidified cooking process, while controlling the high-frequency output, the control unit 6 operates the blower 23. By so doing, the high frequency is supplied into the oven cavity 2 through the suction port 7 or the discharge port 8, and steam generated from the food 1 during heating is led to the adsorbent 22 through the suction port 7, and is adsorbed by the adsorbent 22 in order to maintain the humidity inside the oven cavity 2 low, thereby realizing dehumidified cooking.

The construction shown in FIG. 9 and having the heating means 3 above the oven cavity 2 enables humidified or dehumidified cooking under optimum heating conditions, as in Embodiment 1.

(Embodiment 6)

In this embodiment, in addition to the effects mentioned in Embodiment 5 above, the moisture adsorption and regeneration processes can be selectively effected. To this end, moisture is entrapped inside the oven cavity 2 directly from air outside the oven cavity 2 in the moisture adsorbing process, and steam is directly discharged outside the oven cavity 2 in the regeneration process.

Figure 10:
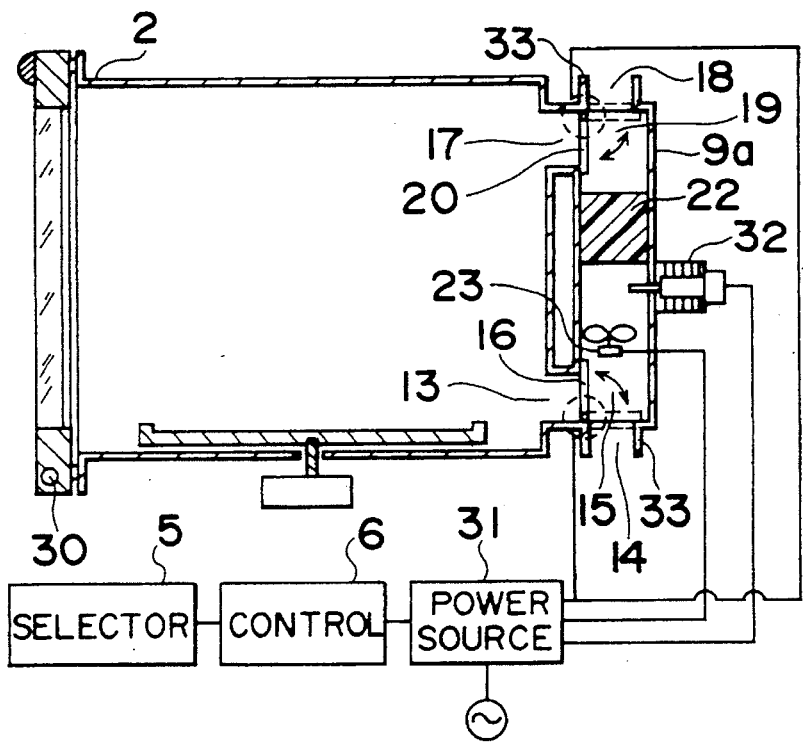
FIG. 10 is a view similar to FIG. 5, but according to a sixth embodiment of the present invention.

FIG. 10 depicts a microwave oven having an oven cavity 2 defined therein for accommodating food 1, and a door 30 for selectively opening and closing the oven cavity 2. This oven also has an internal suction port 13 and an internal discharge port 17 both facing the oven cavity 2, and an external suction port 14 and an external discharge port 18 both facing the outside of the oven cavity 2. The oven further has a suction duct 15 accommodating a suction port switching member 16, and a discharge duct 19 accommodating a discharge port switching member 20. The suction port switching member 16 operates to open either the internal suction port 13 or the external suction port 14, while the discharge port switching member 20 operates to open either the internal discharge port 17 or the external discharge port 18. The suction duct 15 and the discharge duct 19 communicate with each other through a waveguide 9a.

The external suction port 14 and the external discharge port 18 are provided with respective microwave cut-off means such as, for example, perforated plates. Inside the waveguide 9a are provided an adsorbent 22 such as, for example, silica gel, zeolite or the like, a blower 23 for sending air to the adsorbent 22, and a high-frequency supply means 32 such as, for example, a magnetron for supplying high-frequency energy into the oven cavity 2 through the waveguide 9a.

A power source 31 supplies the blower 23 and the high-frequency supply means 32 with electric power, and a control unit 6 controls the power source 31 on the basis of a signal from the cooking method selecting means 5, which selects any one of "humidified cooking" and "dehumidified cooking" depending on information from a sensor. The cooking method can also be selected manually. The control unit 6 also controls the operation of the suction port switching member 16 and that of the discharge port switching member 20.

In the above-described construction, when "humidified cooking" is selected by the cooking method selecting means 5, prior to cooking (at the end of cooking), moisture in the air is adsorbed by the adsorbent 22 in the moisture adsorbing process. Thus absorbing process is followed by the humidified cooking process. That is, in the moisture adsorbing process, on the basis of the signal indicative of "humidified cooking" selected manually or automatically by the cooking method selecting means 5, the control unit 6 controls the suction port switching member 16 and the discharge port switching member 20 to open the external suction port 14 and the external discharge port 18, respectively, as shown in FIG. 10. Also, as is the case with Embodiment 5, the control unit 6 operates the blower 23 without supplying the high-frequency supply means 32 with electric power so that moisture may be adsorbed by the adsorbent 22.

In the humidified cooking process, the control unit 6 controls the suction port switching member 16 and the discharge port switching member 20 to move to respective positions as indicated by dotted lines in FIG. 10, thereby opening the internal suction port 13 and the internal discharge port 17, respectively. Then, humidified cooking is effected, as in Embodiment 5.

On the other hand, when "dehumidified cooking" is selected by the cooking method selecting means 5, the moisture contained in the adsorbent 22 is removed therefrom in the regeneration process prior to cooking. This regeneration process is followed by the dehumidified cooking process.

In the regeneration process, the control unit 6 controls the suction port switching member 16 and the discharge port switching member 20 to be positioned as indicated by solid lines in FIG. 10, and the adsorbent 22 is regenerated as in Embodiment 5.

In the dehumidified cooking process, the control unit 6 controls the suction port switching member 16 and the discharge port switching member 20 to be positioned as indicated by dotted lines in FIG. 10 so that dehumidified cooking is effected as in Embodiment 5.

If the construction shown in FIG. 10 is additionally provided with the heating means 3 above the oven cavity 2, humidified or dehumidified cooking is effected under optimum heating conditions, as in Embodiment 4.

A circulation duct separate from the waveguide 9a may be provided additionally.

(Embodiment 7)

This embodiment aims at enabling humidified or dehumidified cooking, by feeding an optimum amount of moisture into the oven cavity 2 within a short period of time.

To this end, the microwave oven is provided, inside the waveguide 9a, with a high-frequency control means 34, which is comprised of, for example, a pair of pivotally arranged perforated plates. The high-frequency control means 34 allows air sent from the blower 23 to the adsorbent 22 to pass therethrough, but prevents high-frequency generated by the high-frequency supply means 32 from reaching the adsorbent 22. Cooking is effected by operating the high-frequency control means 34 on the basis of a signal from the control unit 6.

In the case of humidified cooking, on the basis of the signal indicative thereof selected manually or automatically by the cooking method selecting means 5, the control unit 6 performs the moisture adsorbing process, and then the humidified cooking process. In the moisture adsorbing process, the control unit 6 operates the blower 23 without supplying the high-frequency supply means 32 with electric power so that the moisture may be adsorbed by the adsorbent 22.

Figure 11:
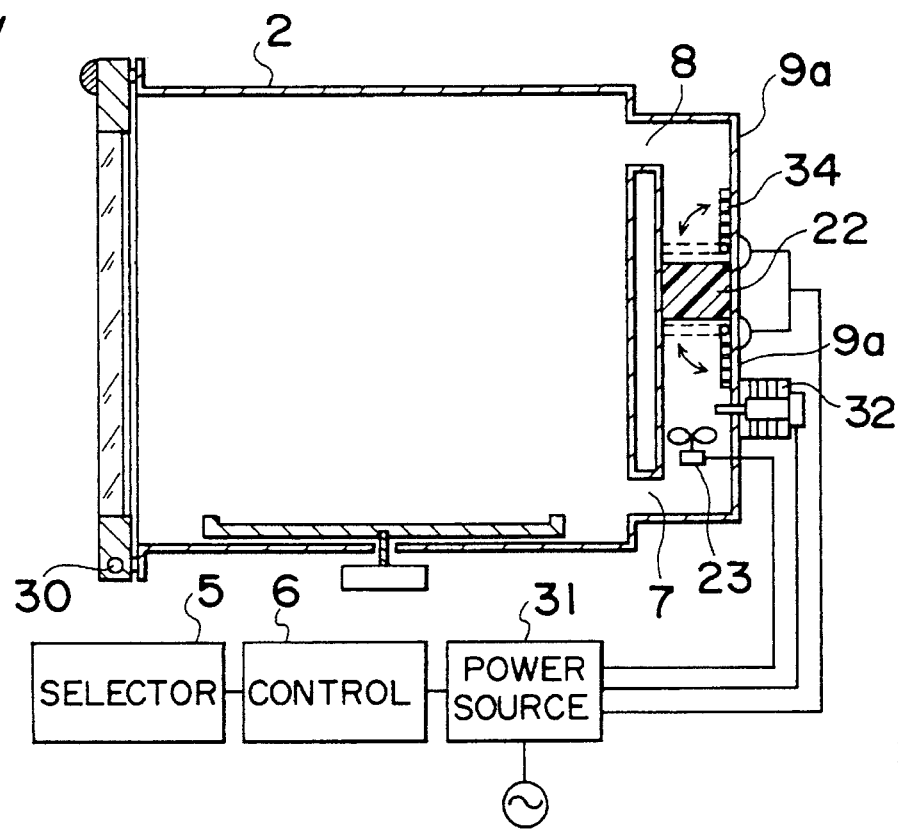
FIG. 11 is a view similar to FIG. 5, but according to a seventh embodiment of the present invention.

In the humidified cooking process, as shown in FIG. 11, the control unit 6 sets the high-frequency control means 34 at a position where high frequency is supplied to the adsorbent 22, supplies the high-frequency supply means 32 with electric power, and operates the blower 23. Therefore, the moisture adsorbed by the adsorbent 22 can be sent, as steam, into the oven cavity 2 within a short period of time, and the high frequency supplied into the oven cavity 2 through the waveguide 9a and through the suction port 7 or the discharge port 8 heats and cooks the food 1.

In the case of dehumidified cooking, on the basis of the signal from the cooking method selecting means 5, the control unit 6 controls, prior to cooking, the high-frequency supply means 32 to remove the moisture from the adsorbent 22 within a short period of time. This regeneration process is followed by the dehumidified cooking process. More specifically, in the regeneration process, as shown in FIG. 11, the control unit 6 sets the high-frequency control means 34 at a position where high frequency is supplied to the adsorbent 22, feeds electric power to the high-frequency supply means 32, and operates the blower 23.

In the dehumidified cooking process, the control unit 6 sets the high-frequency control means 34 at a position where no high frequency is supplied to the adsorbent 22, as indicated by dotted lines in FIG. 11. The control unit 6 then operates the blower 23 and feeds electric power to the high-frequency supply means 32. Accordingly, while enabling high-frequency heating, the steam generated from the food 1 during cooking is adsorbed by the adsorbent 22, thus realizing dehumidified cooking.

In the case of heating with high frequency alone by stopping supply of steam into the oven cavity 2, the control unit 6 sets the high-frequency control means 34 at the position where no high frequency is supplied to the adsorbent 22, and electric power is supplied to the high-frequency supply means 32. Because only the high frequency is supplied into the oven cavity 2, simple high-frequency heating is effected.

(Embodiment 8)

Figure 12:
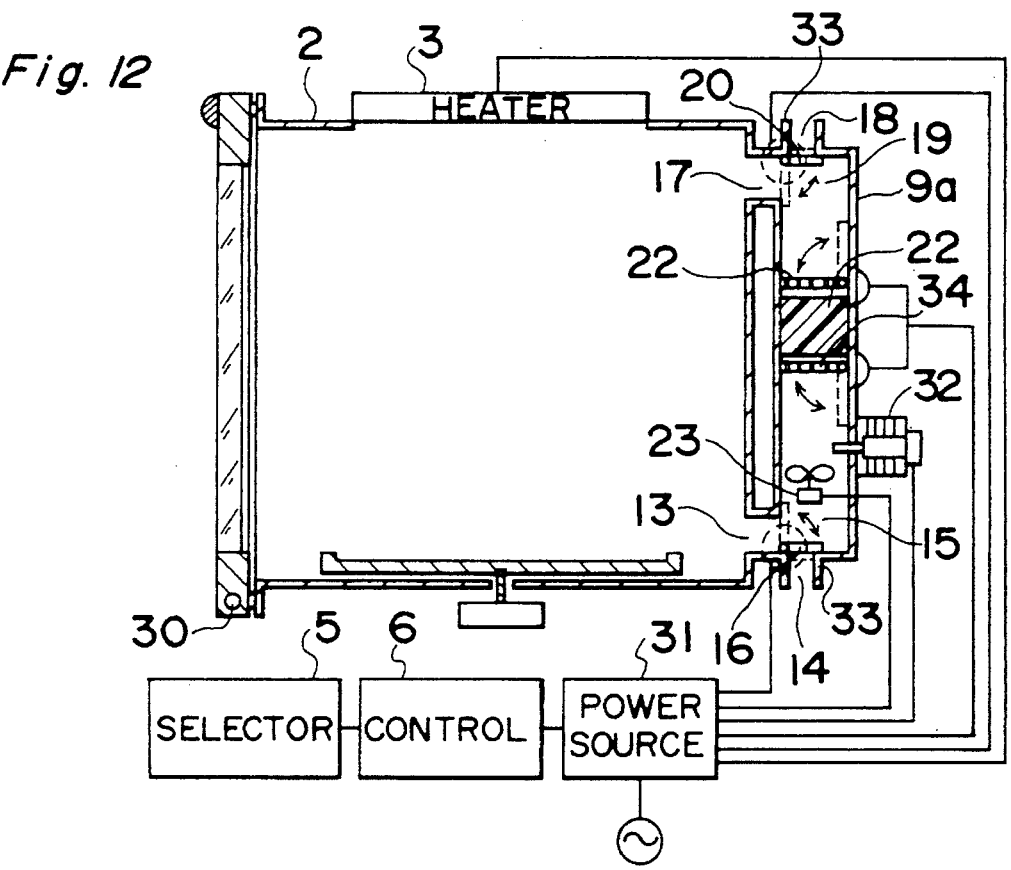
FIG. 12 is a view similar to FIG. 5, but according to an eighth embodiment of the present invention.

FIG. 12 depicts a combination oven having substantially the same construction as the oven shown in FIG. 10, but differs therefrom in that the oven of FIG. 12 is provided, inside the waveguide 9a, with a high-frequency control means 34 such as, for example, a pair of pivotally arranged perforated plates. The high-frequency control means 34 allows air sent from the blower 23 to pass therethrough, but cuts off high-frequency supplied from the high-frequency supply means 32. Cooking is effected by operating the high-frequency control means 34 on the basis of a signal from the control unit 6.

When humidified cooking is effected, the operation of each element in the moisture adsorbing process and in the cooking process is the same as that according to Embodiment 6 or 7. Also, when dehumidified cooking is effected, the operation of each element in the regeneration process and in the cooking process is the same as that according to Embodiment 6 or 7.

By the construction shown in FIG. 12, moisture is entrapped inside the oven cavity 2 directly from air outside the oven cavity 2 in the moisture adsorbing process, and steam is discharged outside directly from the oven cavity 2 in the regeneration process so that each of the moisture adsorbing process and the regeneration process may be effected arbitrarily, thereby realizing enabling humidified or dehumidified cooking in which the amount of moisture inside the oven cavity 2 is properly regulated.

(Embodiment 9)

Figure 13:
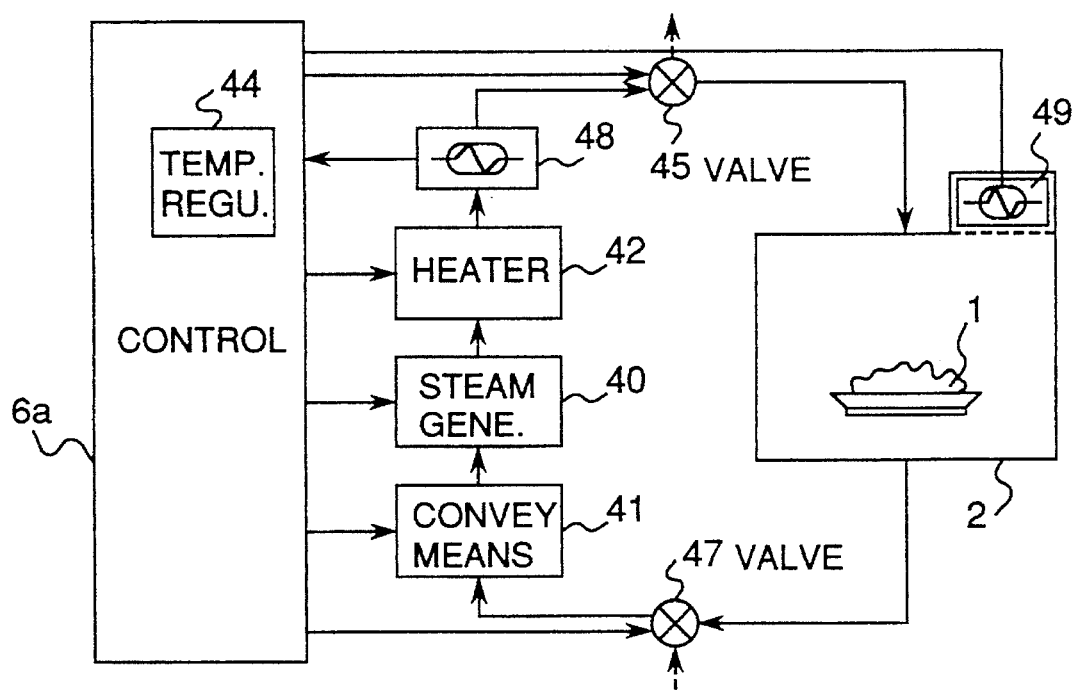
FIG. 13 is a block diagram of an oven according to a ninth embodiment of the present invention.

FIG. 13 is a block diagram of a microwave oven.

In FIG. 13, steam generated by a steam generator 40 is sent to a heater 42 by a conveying means 41, and is heated to a specified temperature. The heater 42 is controlled by a temperature regulator 44 provided in a control unit 6a, and is designed to heat the steam to the specified temperature. The steam heated to the specified temperature by the heater 12 is supplied into the oven cavity 2 through a valve 45. The steam exhausted from the oven cavity 2 passes through a valve 47 and returns to the conveying means 41, thereby forming a circulation path as shown in the diagram. Each of the valve 45 and the valve 47 is employed as a path switching means.

A temperature sensor 48 detects the temperature of the steam heated by the heater 42, and sends a detection signal to the control unit 6a. On the basis of this signal, the temperature regulator 44 controls the heater 42 with its heating electric energy adjusted properly.

A status sensor 49 detects at least one of the temperature, humidity, and pressure of gas generated by food 1 to be heated in the oven cavity 2, or at least one of those of the interior of the oven cavity 2. The status sensor 49 sends a detection signal to the control unit 6a. The control unit 6a controls, on the basis of this detection signal, the steam generator 40, the conveying means 41, the heater 42, the valve 45 and the valve 47 so that the food 1 may be properly heated by the steam.

Figure 14:
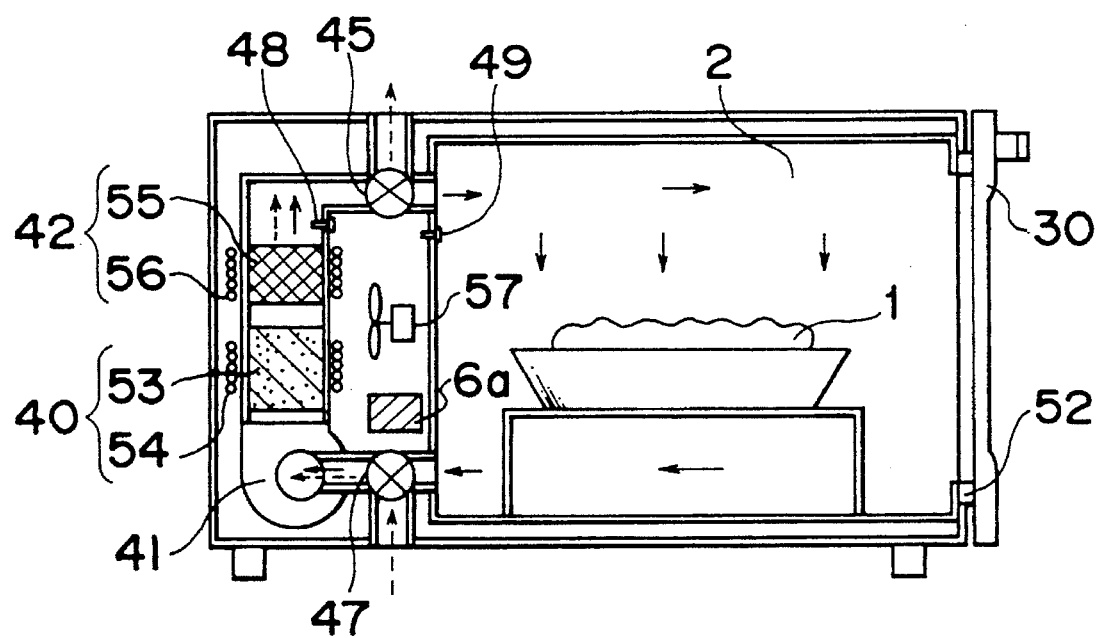
FIG. 14 is a schematic vertical sectional view of the oven of FIG. 13.

The valve 45 and the valve 47 employed as the path switching means are intended to form not only a circulation path indicated by solid lines in FIG. 14, but also a path indicated by dotted lines in FIG. 14 to allow air or steam to flow between the interior and the exterior of the oven cavity 2. More specifically, the control unit 6a controls the valve 45 and the valve 47 to discharge or introduce the air from or into the circulation path, or to discharge excessive steam therefrom so that the state of the gas inside the oven cavity 2 such as the pressure, gas components or the like may be optimum and safe for heating of the food 1.

FIG. 14 depicts a specific structure of the microwave oven of FIG. 13.

In FIG. 14, the oven cavity 2 is selectively opened and closed by the door 30 through which the food 1 can be put in and taken out easily. When the door 30 is closed, the oven cavity 2 is properly sealed by a packing 52 attached along the outer edge of the internal surface of the door 30 in order to prevent the steam from escaping from between the door 30 and the oven cavity 2, thereby avoiding burns by high-temperature steam, as well as trouble with the appliance due to condensation water from steam.

A fan 41 employed as the conveying means sends air to the steam generator 40 and conveys steam generated thereby. The steam generator 40 comprises an adsorption unit 53 including a magnetic material and an adsorbent such as, for example, zeolite, and a heating coil 54 for induction-heating the adsorption unit 23. The derailed structure of the steam generator 40 is described later. The steam generated by the steam generator 40 is sent to and heated by the heater 42. The heater 42 comprises a heat generation unit 55 made of honeycomb-shaped stainless sheets having a large number of passages defined therein, and a heating coil 56 for induction-heating the units. The control unit 6a controls the electric power to the heater 42 on the basis of a steam temperature signal detected by the temperature sensor 48.

The steam thus heated to a desired temperature is sent into the oven cavity 2 through the valve 45, as indicated by solid line arrows in the diagram, and diffuses from above to below in the oven cavity 2 to reach the food 1 at a uniform temperature and a uniform flow velocity, thereby favorably heating the food 1 with steam. From a lower portion of the oven cavity 2, a circulation path to the fan 41 through the valve 47 is formed.

At the start or end of operation of the appliance, the control unit 6a controls the valve 45 and the valve 47 in order to replace steam inside the oven cavity 2 and in the circulation path with air outside the oven cavity 2, or to discharge the steam therefrom so that an appropriate exchange of air and steam may be effected between the outside and the circulation path, as indicated by arrows in the diagram. When it is necessary to take in external air in order for the zeolite of the adsorption unit 53 to adsorb moisture contained therein, the control unit 6a controls the valve 45 and the valve 47 to form a path as indicated by the dotted lines in the diagram. Reference numeral 57 denotes a cooling fan, which cools the heating coils 54 and 56 and the control unit 6a to guarantee safety and reliability.

Figure 15A:
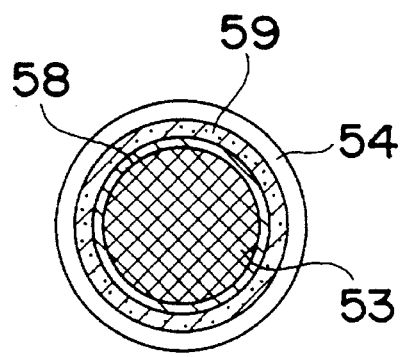
FIG. 15A is a horizontal sectional view of a steam generator mounted in the oven of FIG. 14.
Figure 15B:
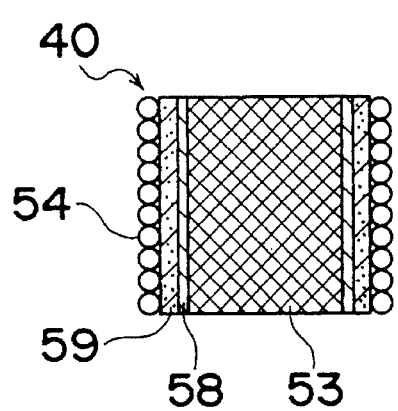
FIG. 15B is a vertical sectional view of the steam generator of FIG. 15A.

FIGS. 15A and 15B depict the steam generator 40 having a cylindrical shape, in which the adsorption unit 53 is composed of a molded material containing zeolite particles and iron powder mixed with each other. The zeolite adsorbs water molecules. The iron powder is induction-heated by the heating coil 54, and heats the zeolite to provide the water molecules with thermal energy so that the water molecules adsorbed thereby may be released as steam. An outer tube 58 and a bobbin 59 are interposed between the adsorption unit 53 and the heating coil 54 so as to encircle the adsorption unit 53. The outer tube 58 is made of ceramic or other non-magnetic material, while the bobbin 59 is made of ceramic to insulate and hold the heating coil 54, thus avoiding overheating of the heating coil 54 and enhancing the efficiency to heat the adsorption unit 53.

The adsorption unit 53 may be a mixture of adsorptive particles of zeolite and aluminum particles, or may be of a structure containing zeolite particles in honeycomb-shaped or concentrically arranged cylindrical sheets made of stainless steel or aluminum.

Figure 16A:
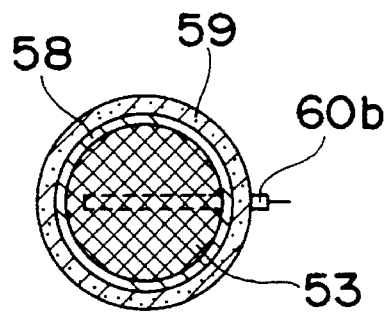
FIGS. 16A and 16B are views similar to FIGS. 15A and 15B, respectively, but indicating a modification thereof.
Figure 16B:
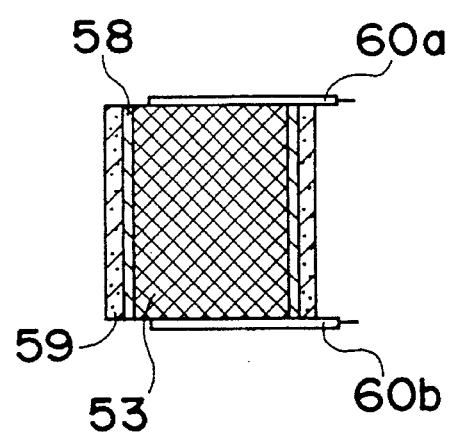

FIGS. 16A and 16B depict a modification of the steam generator 40. The steam generator of FIGS. 16A and 16B differs from that of FIGS. 15A and 15B in that the former has no heating coil, but has two electrodes 60a and 60b between which the adsorption unit 53 is sandwiched. In this case, upon energization of the two electrodes 60a and 60b, the metallic particles or the metallic structure of the adsorption unit 53 is directly energized and heat the zeolite particles by electric resistance, thus providing substantially the same effects as mentioned above.

Figure 17A:
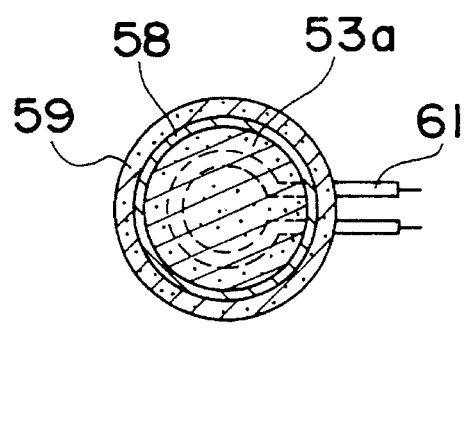
FIGS. 17A and 17B are views similar to FIGS. 15A and 15B, respectively, but indicating another modification thereof.
Figure 17B:
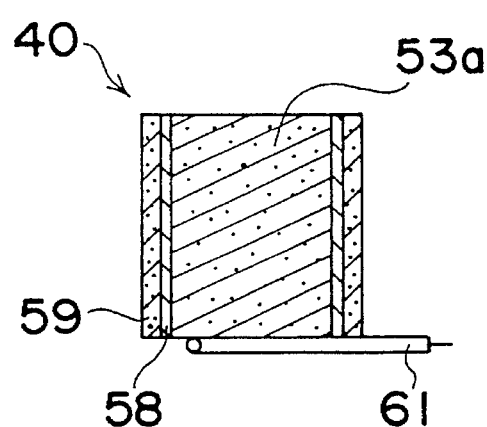

FIGS. 17A and 17B depict another modification of the steam generator 40, which contains zeolite particles 53a encircled by the outer tube 58 and the ceramic bobbin 59. A ring-shaped sheathed heater 61, employed as an exciting means, is disposed below the zeolite particles to release water molecules adsorbed by the zeolite particles 53a. In applications where the exciting means makes use of induction heating or resistance heating, it is sufficient if an adsorbent such as zeolite and a magnetic or metallic material are combined with each other. In contrast, in applications where neither induction heating nor resistance heating is employed, it is sufficient if thermal energy is applied to the adsorbent using a sheathed heater or the like.

Figure 18A:
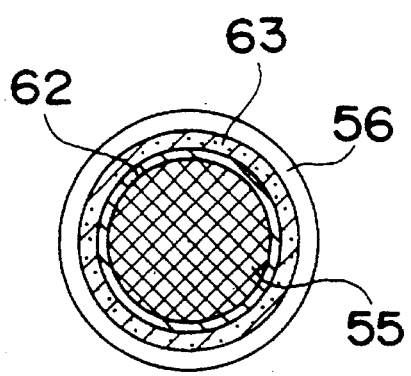
FIG. 18A is a horizontal sectional view of a heater mounted in the oven of FIG. 14.
Figure 18B:
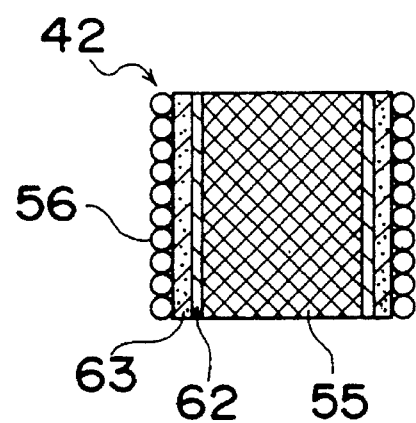
FIG. 18B is a vertical sectional view of the heater of FIG. 18A.

FIGS. 18A and 18B depict the heater 42, which comprises a heat generation unit 55 made of thin stainless steel plates having a honeycomb-shaped lattice structure. In these figures, steam flows in a direction longitudinally of the heater 42. The heat generation unit 55 is held by an insulating outer tube 62 made of, for example, non-magnetic ceramic, while the insulating outer tube 62 is encircled by a ceramic bobbin 63, which holds and insulates the heating coil 56 wound therearound.

The configuration of the heating coil 56 and the heat generation unit 55 is designed to guarantee uniform heating by the heat generation unit 55 and insulate it sufficiently. It is, therefore, difficult to provide a high electrical coupling between the heating coil 56 and the heat generation unit 55, and the coupling coefficient is about 0.7 to 0.8. The same is true for the coupling coefficient between the heating coil 54 and the adsorption unit 53 of the steam generator 40 shown in FIG. 15A.

Figure 19:
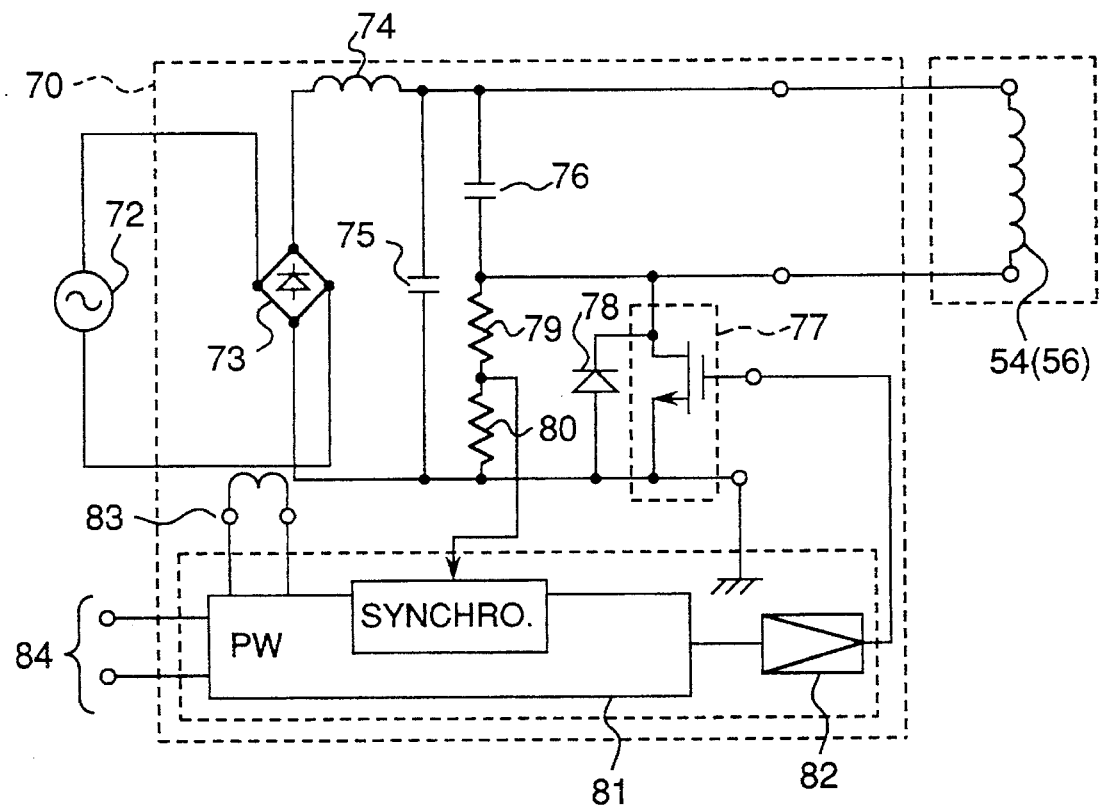
FIG. 19 is a circuit diagram of an inverter circuit mounted in the oven of FIG. 14.

FIG. 19 depicts an inverter circuit 70 suited for use in driving the induction coil 54 or 56 at a high efficiency.

The inverter circuit of FIG. 19 is supplied with electric power from a commercial power source 72 and comprises a rectifier 73, an inductor 74, a capacitor 75, a resonant capacitor 76, a transistor 77, and a diode 78. The resonant capacitor 76 and the heating coil 54 (56) compose a resonant circuit and, hence, works as a resonant type inverter circuit. An output of the inverter circuit 70 is supplied to the heating coil 54 (56) as high-frequency current of, for example, 20 to 100 kHz, thus induction-heating the adsorption unit 53 and heat generation unit 55. Furthermore, the heating coil 54 (56) has a low coupling coefficient for its structure as mentioned above, causing a considerably large leakage inductance. However, such a resonant type inverter circuit renders the loss of the transistor 77 or the like to be low, realizing a highly efficient electric power conversion. Hence, the steam generator 40 or the heater 42 employing such induction heating can be raised in efficiency.

In FIG. 19, reference numerals 79 and 80 compose a detection circuit required for a drive circuit 81 to drive the transistor 77 in synchronism with the resonant circuit mentioned above. Reference numerals 82 and 83 denote an amplifier and a current detector, respectively, which are intended to stabilize the electric power supplied from the inverter circuit 70 to the adsorption unit 53 or the heat generation unit 55. Reference numeral 84 denotes control terminals, which receives control signals from the control unit 6a.

Figure 20:
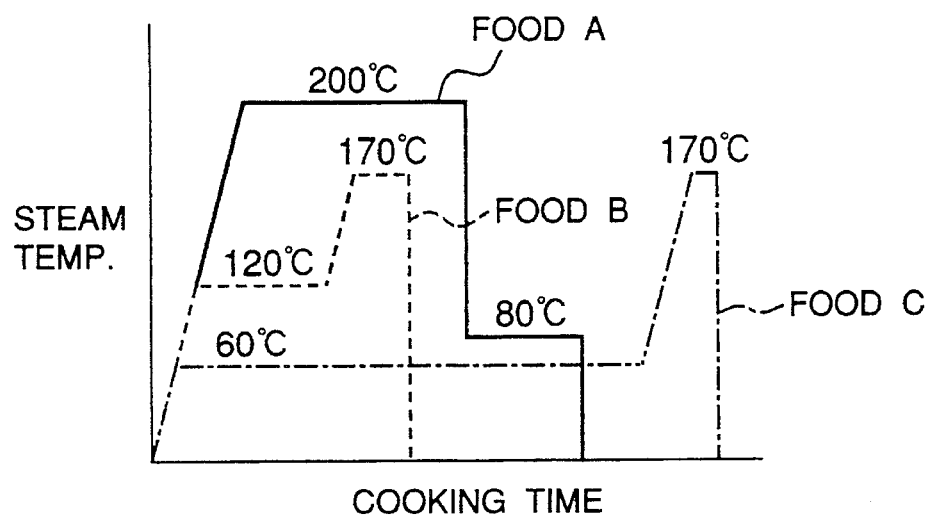
FIG. 20 is a sequence diagram for controlling the heating temperature in the oven of FIG. 14.

The oven of the above-described construction effects cooking as shown in, for example, FIG. 20 under the control of the control unit 6a.

In the case of food A, it is heated and dried by dry steam at 200° C. simultaneously with the start of cooking. After specified drying, finish heating is done for a short period of time with low-temperature steam at 80° C., thus terminating cooking. In the case of food B, it is overheated with a slightly overheated steam at 120° C. and is dried at 170° C., until the cooking process is terminated. In the case of food C, it is heated with low-temperature steam at 60° C. and is further heated with overheated steam at 170° C. immediately before the cooking process is terminated.

Thus, the oven according to the present invention can heat and cook food by appropriately adjusting the steam temperature depending on the kind and quantity of food, thus optimizing cooking according to the material to be cooked.

(Embodiment 10)

Figure 21:
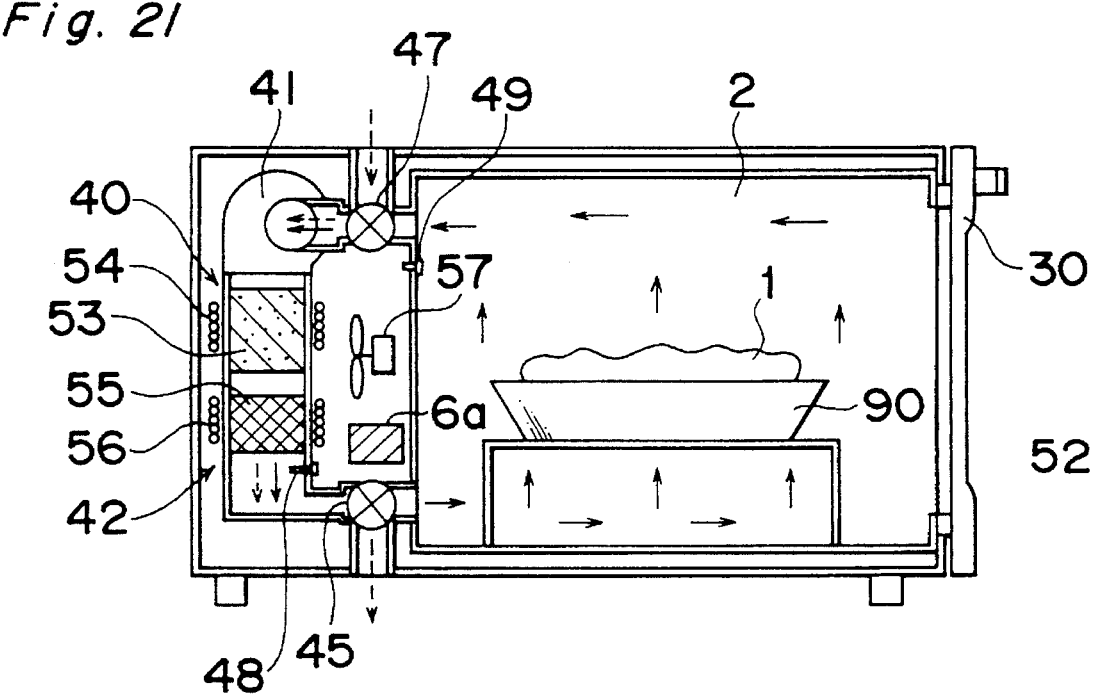
FIG. 21 is a schematic vertical sectional view of an oven according to a tenth embodiment of the present invention.

FIG. 21 depicts a microwave oven having an oven cavity 2 in which steam diffuses from below to above. Such a steam diffusion is preferred depending on the kind of food to be cooked. For example, this embodiment is suited in the case of cooking in which it is desired that a container 90 of the food 1 is higher in temperature than the food 1. Anyway, either the structure of FIG. 14 in which the steam diffuses from above to below, or the structure of FIG. 21 in which the steam diffuses from below to above is effective for desired heating because the distribution of the steam velocity or steam temperature is substantially uniform at the time the steam is brought into contact with the food 1.

In the embodiments of FIGS. 14 and 21, the steam generated by the steam generator 40 is heated by the heater 42, supplied into the oven cavity 2 to heat the food 1 accommodated therein, and sent to the steam generator 40 in which the steam is adsorbed by the adsorbent (the case is different when the valve 45 and the valve 47 are switched). However, if a large volume of steam is needed in the oven cavity 2, the steam should be circulated in the above process. In this case, the efficiency is lowered when the returning steam is adsorbed by the adsorbent in the steam generator 40 and is vaporized again. To overcome this problem, the steam generator 40 may be provided with a bypass to direct the returning steam to the heater 42 through the bypass, thereby increasing the efficiency.

In the foregoing embodiments, although zeolite is used as the adsorbent, the adsorbent is not limited thereby, and any material can be used if it has superior water absorption properties and is safe in sanitation. A porous body having continuous foams and made of ceramics or plastics may be used as the adsorbent. Alternatively, a fibrous body made of paper, ceramic fiber, plastic fiber, natural fiber of paper or cotton, or their laminate may be used. Also, ceramics, plastics or the like which has undergone water absorption treatment can be used. However, if the adsorbent is brought into contact with overheated steam, the material thereof must be selected in consideration of heat resistance.

The adsorption unit 53 may be encircled by any one of the outer tube 58 and the ceramic bobbin 59 (heat resistant bobbin) depending on the construction.

Furthermore, although the heater has been discussed as having honeycomb-shaped stainless steel sheets containing a large number of passages defined therein, it is not limited thereby. It is sufficient if the heater is made of a conductor having a large number of through-holes defined therein. If a heating method other than induction heating is employed, the heater may be made of a material having a high thermal conductivity and also having a large number of through-holes defined therein.

Moreover, the heater is not limited to the honeycomb-shaped structure, and a lattice or any other structure may be employed so long as through-holes are formed therein.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An oven having an oven cavity defined therein in which food to be cooked is to be accommodated, said oven comprising:

a food heating means for heating the food accommodated in the oven cavity;

a humidity regulating means for regulating humidity inside the oven cavity, said humidity regulating means comprising a steam adsorption means for adsorbing steam;

a cooking method selecting means for selecting a cooking method; and a control means for controlling said humidity regulating means in response to a signal from said cooking method selecting means to regulate an amount of moisture contained in the oven cavity.

2. The oven according to claim 1, wherein said humidity regulating means comprises an internal suction port facing the oven cavity, an internal discharge port facing the oven cavity, a circulation duct for communicating said internal suction port and said internal discharge port with each other, a blower for sending air to said steam adsorption means, and a heat supply means for supplying said steam adsorption means with thermal energy, and wherein said steam adsorption means is accommodated in said circulation duct.

3. The oven according to claim 1, wherein said humidity regulating means comprises an internal suction port facing the oven cavity, an external suction port facing an outside of the oven cavity, a suction duct for communicating said internal suction port and said external suction port with each other, a suction port switching member accommodated in said suction duct, an internal discharge port facing the oven cavity, an external discharge port facing the outside of the oven cavity, a discharge duct for communicating said internal discharge port and said external discharge port with each other, a discharge port switching member accommodated in said discharge duct, and a communication duct for communicating said suction duct and said discharge duct with each other.

4. The oven according to claim 3, wherein said humidity regulating means further comprises a blower for sending air to said steam adsorption means, and a heat supply means for supplying said steam adsorption means with thermal energy, and wherein said steam adsorption means is accommodated in said communication duct.

5. The oven according to claim 1, wherein said humidity regulating means comprises an internal suction port facing the oven cavity, an internal discharge port facing the oven cavity, a circulation duct for communicating said internal suction port and said internal discharge port with each other, a blower for sending air to said steam adsorption means, and a high-frequency supply means for supplying said steam adsorption means with high frequency, and wherein said steam adsorption means is accommodated in said circulation duct.

6. The oven according to claim 1, wherein said steam adsorption means contains one of a magnetic material and a metallic material, wherein said humidity regulating means comprises an exciting means for applying thermal energy to said one of the magnetic material and the metallic material, and wherein energization of said exciting means renders said steam adsorption means to emit moisture adsorbed thereby to generate steam.

7. The oven according to claim 6, wherein said exciting means comprises an induction-heating means.

8. The oven according to claim 1, further comprising a heater interposed between the oven cavity and said humidity regulating means.

9. The oven according to claim 1, wherein said humidity regulating means further comprises a circulation duct, a suction port communicating from said oven cavity to said circulation duct, and a discharge port communicating to said oven cavity from said circulation duct; and said steam adsorption means is operable to adsorb steam from air passing into said circulation duct from said suction port and back into said oven cavity from said discharge port.

10. An oven comprising:

a casing defining therein an oven cavity;

a food heater operably communicating with said oven cavity;

a humidity regulating arrangement operably connected to said oven cavity;

a cooking method selector operably connected to said humidity regulating arrangement;

control means operably connected with said cooking method selector and said humidity regulating arrangement for controlling said humidity regulating arrangement to selectively humidify and dehumidify air in said oven cavity depending on a signal from said cooking method selector; and wherein said humidity regulating arrangement includes an internal suction port opening into said oven cavity, an internal discharge port opening into said oven cavity, a circulation duct communicating said internal suction port with said internal discharge port and being provided externally of said oven cavity, a water adsorption element mounted in said circulation duct, an external suction port communicating with said internal suction port and opening to an outside of said oven cavity, a suction port switching member accommodated between said internal suction port and said external suction port, an external discharge port communicating with said internal discharge port and opening to an outside of said oven cavity, and a discharge port switching member accommodated between said internal discharge port and said external discharge port.

11. The oven according to claim 10, wherein said humidity regulating arrangement further includes a heater and a blower mounted in said circulation duct.

12. The oven according to claim 11, wherein said heater comprises a high-frequency generator.

13. The oven according to claim 12, wherein said air circulation fan is operatively connected with said control means and comprises a means for circulating fresh air through said oven cavity from an exterior thereof upon said control means receiving a dehumidified cooking signal from said cooking method selector, to thereby replace air in said oven cavity with outside air having a lower humidity than the air in said oven cavity.

14. The oven according to claim 10, wherein said external suction port opens to an outside of both said oven cavity and said circulation duct; and said external discharge port opens to an outside of both said oven cavity and said circulation duct.

* * * * *